Figure 1:
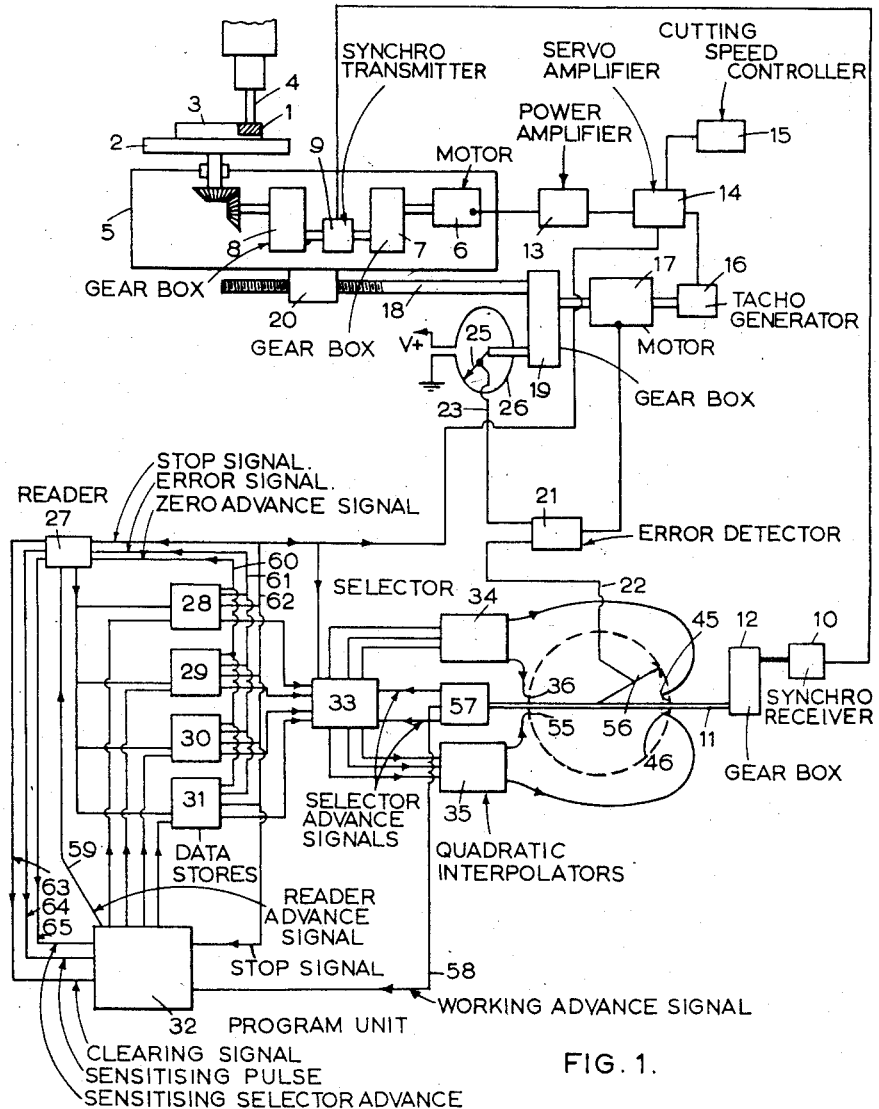

Inventors
R. A. Cail
E. M. Payne

United States Patent Office 2,887,638
Patented May 19, 1959

2,887,638

CONTROL SYSTEM FOR AUTOMATIC
MACHINE TOOLS

Roland Allan Cail, Slough, and Edwin Malcolm Payne, Chorley Wood, England, assignors to Electric & Musical Industries Limited, Hayes, Middlesex, England, a company of Great Britain Application June 29, 1955, Serial No. 518,912

11 Claims. (Cl. 318—39)

This invention relates to control systems for automatic machine tools, and especially through not exclusively to control systems for automatic electronically controlled profiling machines.

In a machine of this latter kind it is obviously desirable that the accuracy of the machine should be consistent, even although the gradient of the profile to be cut may change within wide limits, and one object of the present invention is to provide an improved control system for an automatic machine so that the machine can maintain a high degree of accuracy.

According to the present invention there is provided a control system for automatic machine tools comprising means for deriving an instruction signal from a record, servo means for effecting relative displacement between two components of a machine tool, means for deriving a feedback signal analogous to said relative displacement, means for comparing said instruction and feedback signals to derive an error signal, said servo means being responsive to said error signal to effect said relative displacement, and means responsive to said error signal for adjusting the rate of derivation of said instruction signal.

An automatic machine tool such for example, as a cam profiling mill, may be required to mill or otherwise shape a workpiece to a profile which may be of arbitrary shape. One approach to this problem consists in calculating the required traverse of, say, the worktable of the machine for discrete angular displacements of the worktable and employing the calculated dimensions as instructions to control the worktable. This can be done by storing the calculated dimensions in suitable data stores, for example perforated film records, extracting the stored dimensions successively as the milling operating progresses and employing the extracted dimensions for controlling a servo-system which, in turn controls the worktable traverse.

In a machine of this latter kind it is obviously desirable that the accuracy of the machine should be consistent even although the gradient of the profile to be cut may change within wide limits, and one object of the present invention is to provide an improved control system for an automatic machine so that the machine can maintain a high degree of accuracy.

According to the present invention there is provided a control system for automatic machine tools comprising means for deriving an instruction signal from a record, servo means for effecting relative displacement between two components of a machine tool, means for deriving a feedback signal analogous to said relative displacement, means for comparing said instruction and feedback signals to derive an error signal, said servo means being responsive to said error signal to effect said relative displacement, and means responsive to said error signal for adjusting the rate of derivation of said instruction signal.

According to one aspect of the present invention there is provided a control system for automatic machine tools comprising means for deriving an instruction signal from a record, first displacement means for effecting relative displacement between two components of a machine tool in one co-ordinate direction, in response to said instruction signal derived from said record, second displacement means for effecting relative displacement between said tool and said work carrier in another co-ordinate direction in dependence upon the rate of derivation of said instruction signal to said first displacement means, means responsive to said first displacement means for adjusting simultaneously the rate of derivation of said instruction signal and the rate of relative displacement in the second co-ordinate direction as a function of the relative displacement in the first coordinate direction.

Figure 2:
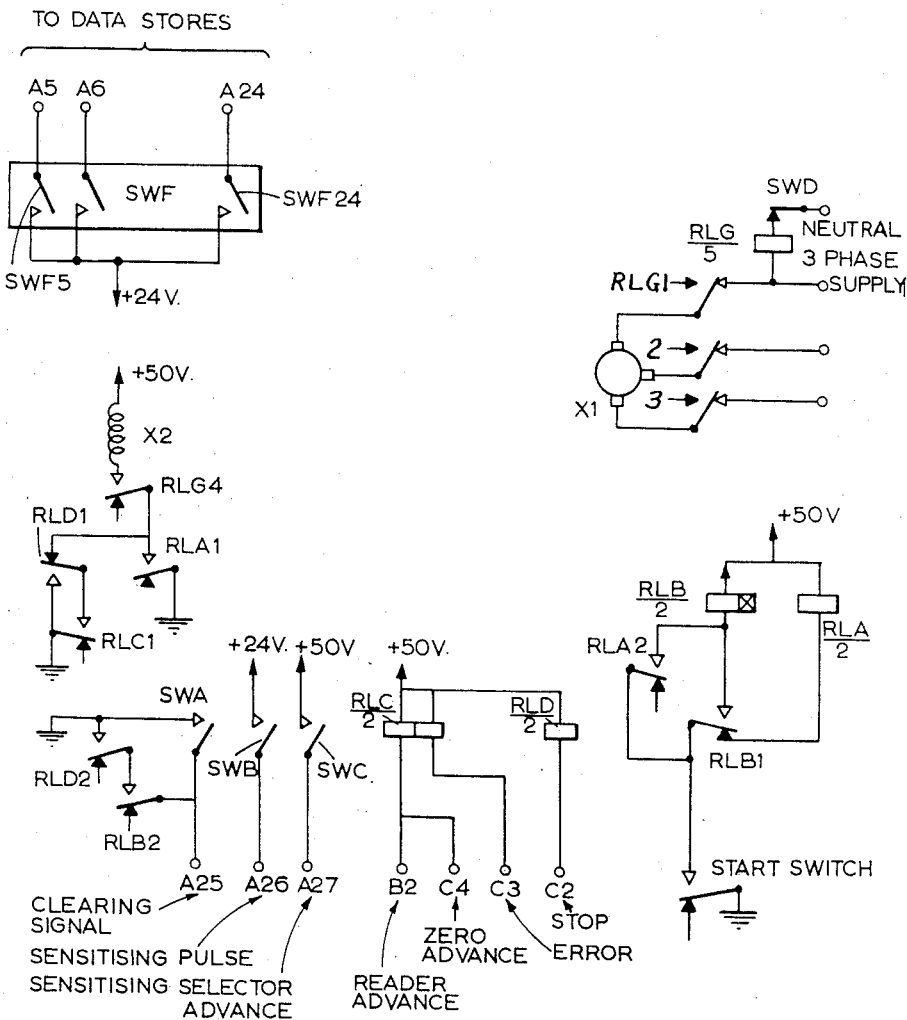
Figure 3:
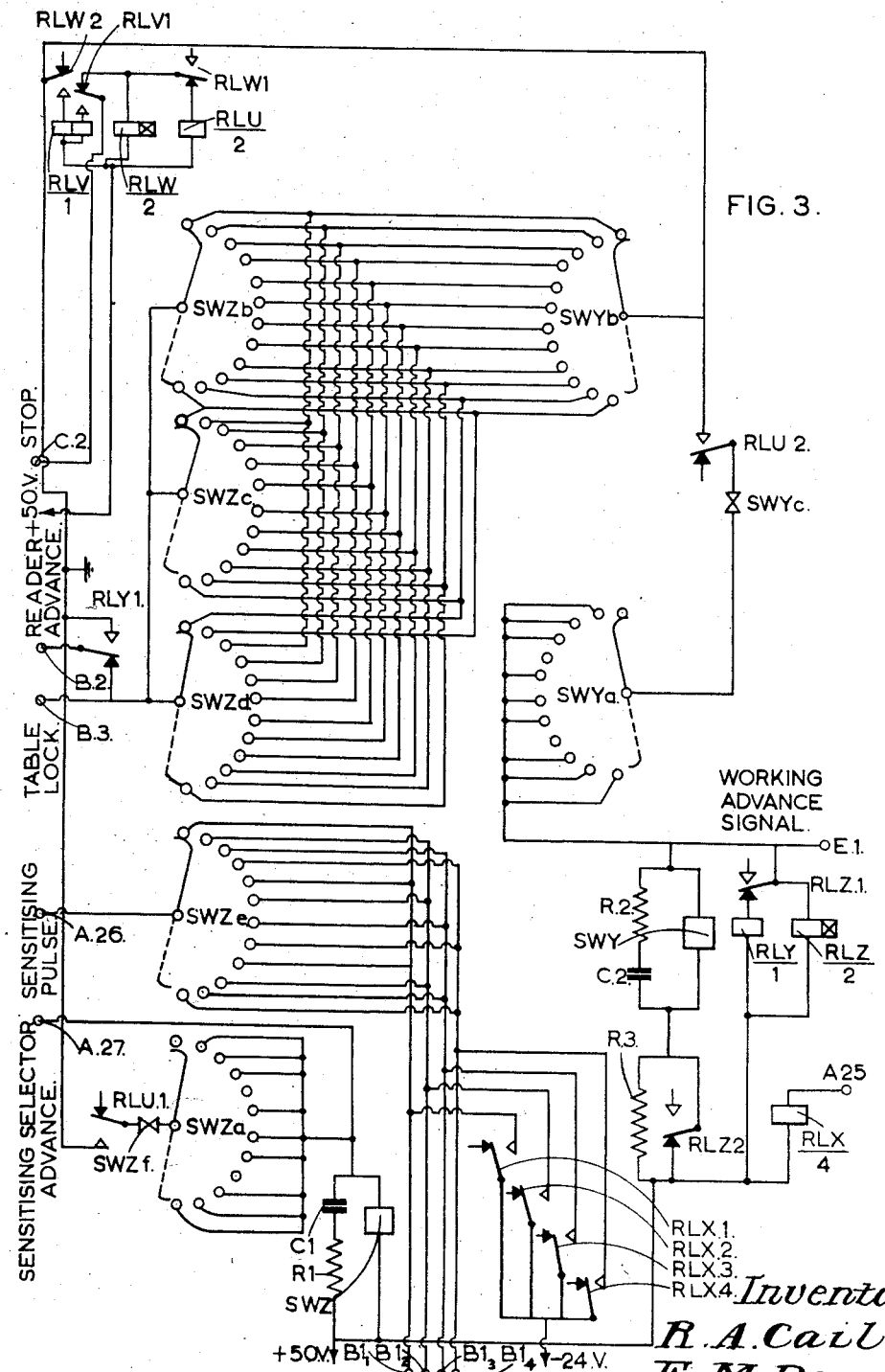
Figure 4:
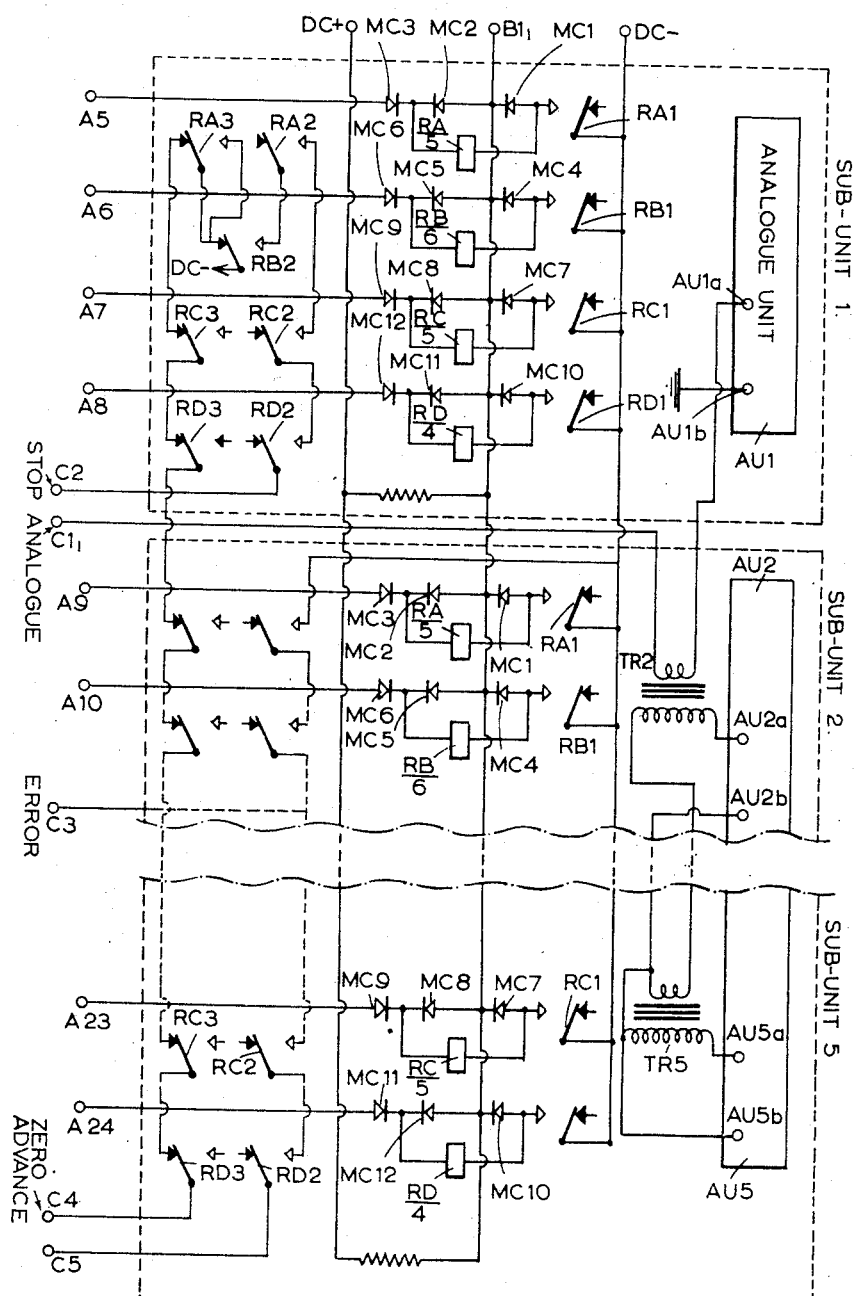
Figure 5:
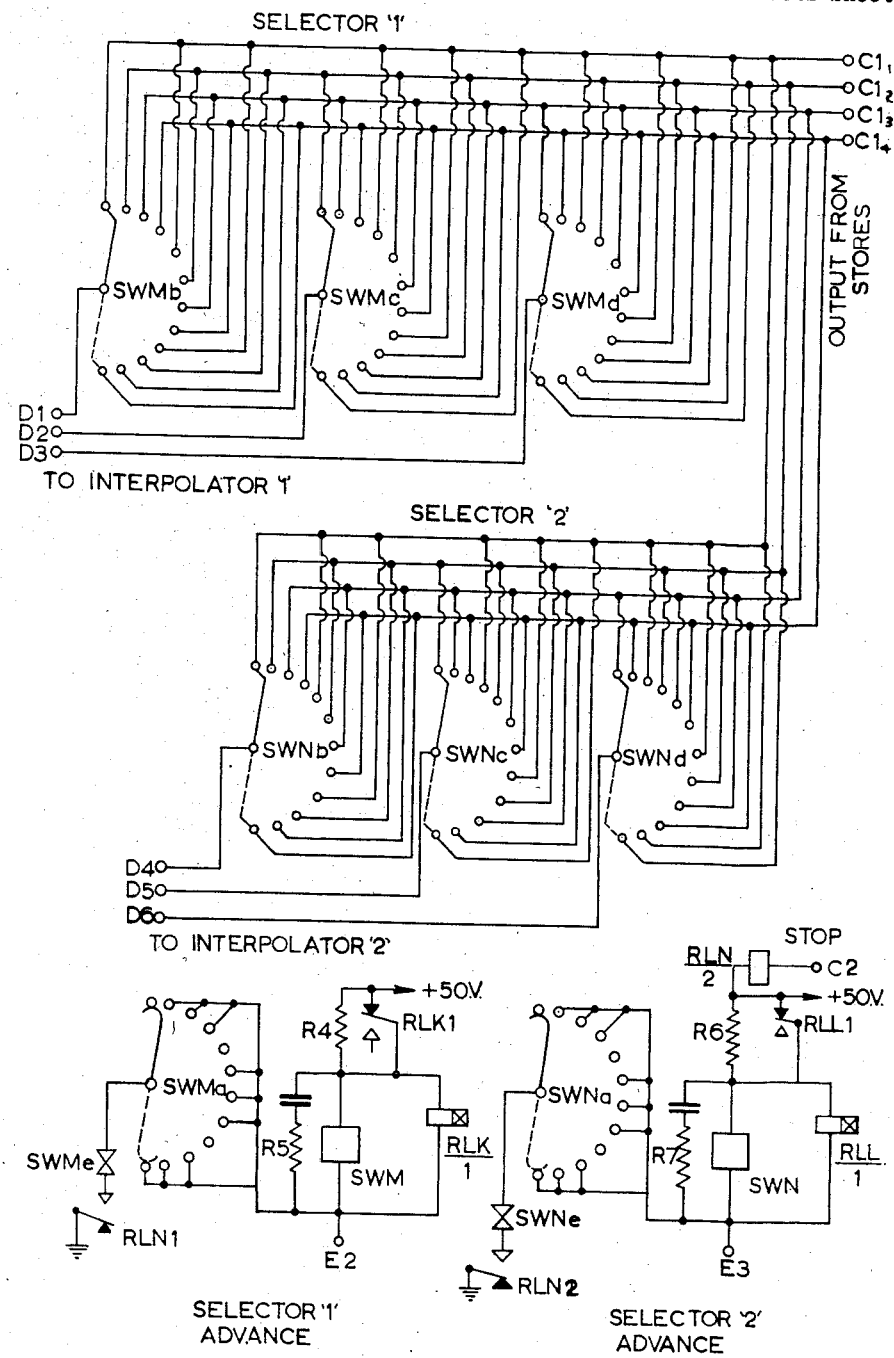

In order that the invention may be clearly understood and readily carried into effect, the invention will be described with reference to the accompanying drawings, in which:

Figure 1 is a diagram mainly in block form of one example of a milling machine control system in accordance with the present invention, Figure 2 is a circuit diagram of the record reader forming part of Figure 1, Figure 3 is a circuit diagram of the programme unit employed in Figure 1, Figure 4 is a circuit diagram of one of the data-stores used in Figure 1, and Figure 5 is a circuit diagram of a selector employed in Figure 1.

Referring to the drawing, the machine illustrated is designed to operate in response to instructions derived from a perforated film record. The instructions are coded in a twenty four bit binary digital code, each instruction occupying one row of records so that a row on the record may have up to twenty-four holes. Apart from functional instructions, which will be referred to subsequently, each instruction relates to the radius to which a work piece has to be cut, at a given angular displacement of the workpiece from a predetermined datum. In preparing the instructions the radius of the milling cutter may have to be taken into consideration, or the machine may be provided with means for automatically compensating for the radius of the cutter as described in co-pending British patent applications Nos. 19,543/54 and 22,251/54.

For simplicity in the present application it will be assumed that the diameter of the cutter is automatically allowed for so that each dimensional instructions denotes the actual radius to which he workpiece has to be cut. It will also be assumed that the co-ordinate spacing of the instructions is constant, in other words that the successive radii recorded as instructions are equiangularly spaced, although provision may be made for variations of the ordinate spacing as described in copending British patent application No. 19,542/54.

Of the twenty-four bits of the code used for each numerical instruction, five groups of four bits, in all bits five to twenty four are used to represent five decimal digits, so that the instructions are recorded in the so-called binary decimal code. The code bits five to nine represent the highest order decimal digit, the bits ten to fourteen the next highest order decimal digit and so on. The use made of the remaining four bits of the code form no part of the present invention and will not be referred to. The binary decimal code is redundant to the extent that each four bits may represent more than ten numbers, and some of the redundant code combinations are used to represent functional instructions. For example four "ones" (represented by holes in the tape) in positions five to nine denotes "stop" which as will appear overrides all other instructions. Four "ones" in positions ten to fourteen denotes "error" and causes the proceeding instructions to be replaced by the next following instruction. "Zero" (represented by no hole on tape)

in all the positions five to twenty-four causes the record to advance, and a hole in all positions gives rise to a clearance of all data stores.

In the diagram of the machine shown in Figure 1 the cutter is represented by the reference 1 and the worktable by the reference 2. A workpiece 3 is shown on the table and it will be assumed that the workpiece has to be milled to form a cam of predetermined profile. The cutter shaft 4 has a fixed axis and the cutter is driven by any suitable means, not shown. The worktable is rotatably mounted on a platform represented by the outline 5 and it can be driven by an electric motor 6 through the intermediary of two gear boxes 7 and 8. A synchrotransmitter or magslip transmitter 9 is disposed as shown between the two gear boxes 7 and 8 so as to be driven by the motor 6, the output of the transmitter 9 being applied to a synchro-receiver 10 so as to maintain a shaft 11 driven by the receiver 10 through the intermediary of a gear box 12 in synchronism with the table rotation.

The electric motor 6 for producing the table rotation is a variable speed D.C. motor and it is energized by the output of a power amplifier 13 which may be of the Ward-Leonard type. The input signal for this power amplifier are received from a cutting speed controller 15 which is referred to as a servo amplifier and may be a thermionic valve amplifier. The input signals to this amplifier is received from a cutting speed controller 15 and assuming that the gain of the amplifier 14 is fixed, the speed of rotation of the motor 6 and therefore of the table 2 is determined by a potential applied to the amplifier 14 from the cutting speed controller 15. The controller 15 may for example consist simply of a potentiometer energised from a source of reference voltage. The gain of the servo amplifier 14 is however adjustable in response to an input potential derived from a tacho generator 16 mounted on the shaft of a servo motor 17 which drives a leadscrew 18 through the intermediary of a gear box 19. The lead screw 18 engages a nut 20 attached to the platform 5 and it will therefore be appreciated that the rotation of the lead-screw 18 effects relative displacement between the axes of the table 2 and of the cutter 1. Therefore it determines the radius to which the workpiece is cut at any particular angular position. The servo motor 17 is energised by the output of an error detector 21 which receives one input via a lead 22 representing the radius to which the workpiece 3 should be cut at the instantaneous working point of the cutter 1. The error detector 21 receives from a lead 23 a second input signal which is an analogue of the table displacement. For simplicity the analogue is shown as being derived from a tap 25 of a simple potentiometer 26, the tap 25 being carried on a rotatable arm driven from the shaft of the motor 17 through gearing in the gear box 19. In practice a more accurate device for deriving the analogue of the table displacement will generally be required and this device may comprise a linear interpolator of the construction described in co-pending U.S. patent application Serial No. 484,202.

The error detector 21 may consist of high gain negative feedback amplifier to which signals on the lead 22 and 23 are applied in polarity opposition.

The signal representing the desired radius of the workpiece of the instantaneous working point of the cutter 1 is a continuously variable signal derived by a process of interpolation from the dimensional instructions recorded on the record described above. The dimensional instructions refer of course to discrete points on the workpiece and in the present example it is assumed that the angular spacing between these points is 1 degree. In normal operation of the machines the dimensional instructions are read from the tape in succession by a tape reader 27 and each instruction is applied in parallel to four data stores 28 to 31. The stores 28 to 31 are however only conditioned for acceptance of a dimensional instruction when they simultaneously receive a sensitising pulse from a programme unit 32, and the programme unit is so constructed that it feeds sensitising pulses in cyclic order to the data stores so that the successive dimensional instructions are accepted in this order by the respective stores. Only a single connection is shown between the reader 27 and the stores 28 to 31 for feeding instructions thereto, but as will appear subsequently this connection comprises 20 conductors, one corresponding to each bit of the code used to represent a dimension. When any one of the data stores 28 to 31 receives a dimensional instruction, it converts the instruction from the binary decimal code formed into a voltage analogue. During the operation of the machine it is necessary that at least three successive stores deliver voltage analogues simultaneously and the outputs of the stores are fed selectively by a selector 33 to two quadratic interpolators 34 and 35. Thus, assuming that during one period the analogues set up by the stores 28, 29 and 30 are applied by the selector 33 to the interpolator 34, the next instruction is set up as an analogue in the store 31 and the selector 33, without disturbing the interpolator 34, applies the analogues from the stores 29, 30 and 31 to the interpolator 35. During the period in question the interpolator 34 effects interpolation among the analogues from the stores 28, 29 and 30, but the period ends when the interpolation has proceeded to the points mid-way between the instructions in the stores 29 and 30, when the interpolator 35 takes over. While the interpolator 35 is operative, store 28 is cleared and the next instruction set up as an analogue in it and when the interpolator 35 reaches the end of its interpolation range the interpolation is taken over again by the interpolator 34, which interpolates among the instructions in stores 30, 31 and 28.

The interpolators are shown merely in block form since their constructions form no part of the present invention. They are preferably of the construction described in co-pending U.S. patent application Serial No. 459,814. The interpolator 34 has eleven output studs 36 to 45 whilst the interpolator 35 has eleven output studs 46 to 55, the end two in each interpolator being half studs and the twenty two studs 36 to 55 being arranged in a circle as shown. When the interpolator 34 is operating the signal applied to the stud 36 represents the required radius of the workpiece at a point midway between the ordinates of the first two instructions applied to the interpolator. Similarly the signal applied to the stud 45 represents the required radius of the workpiece at a point midway between the ordinates of the second two instructions applied to the interpolator 34. The signals applied to the other studs between 36 and 45 correspond to interpolated radii between these two mid-ordinates. For simplicity, no connections are shown in the drawing to the studs between 36 and 45. The studs 46 to 55 to which output signals are applied by the second interpolator 35 similarly correspond to the radii interpolated between the corresponding mid-ordinates. The circle of studs 36 to 45 is scanned by a brush 56 of the make-before-break type, and consequently the signal derived by the brush 56 and appearing on the lead 22 is a continuously variable signal which represents the required radii of the workpiece 3 at closely spaced points. Assuming that instructions are recorded on the tape for an ordinate spacing of 1 degree, the gearing in the boxes 7, 8 and 12 is arranged so that the brush 56, which is synchronised with the rotation of the table 2, makes one half revolution for each degree of rotation of the table 2. Accordingly, the interpolators 34 and 35 evaluate the radius of the cam at intervals of 1/10th of a degree and the relative displacement between the axis of the table and the cutter are controlled accordingly. Linear sub-interpolation may also be employed to increase the accuracy of the evaluation, as described in co-pending U.S. patent application Serial No. 459,814.

The tacho generator 16 sets up a signal which represents the velocity of the servo-motor 17 which is energised from the error detector 21 and therefore represents the rate of relative displacement between the axes of the cutter 1 and table 2. This in turn is roughly proportional to the load on the cutter and to ensure that the load of the cutter never becomes so great that the accuracy of working is impaired, the voltage derived by tacho generator 16 is applied to the servo-amplifier 14 so as to vary the gain of the latter in such a manner that if the rate of relative displacement between the axis of the table 2 and of the cutter 1 tends to become excessive, the rate of rotation of the table is reduced. By this means the rate of relative displacement between the aforesaid axis can be prevented from becoming excessive. It will thus be appreciated that the motor 17 and the associated mechanism constitutes means for effecting relative displacement between two components, namely the cutter 1 and the table 2 in one co-ordinate direction, in response to instructions derived by the tape reader 27 from the recorder. The motor 6 and associated mechanism constitutes means for effecting relative displacement between the cutter 1 and the table 2 in another co-ordinate direction in dependence on the rate of derivation of an instruction signal for the motor 17 (by virtue of the synchronisation effected by the transmitter 9 and receiver 10). The tacho generator 16 and the amplifier 14 constitute means for adjusting simultaneously the rate of derivation of the instruction signal for the motor 17 and the rate of relative displacement effected by the motor 6, since obviously the rate of derivation of the instruction signal for motor 17 depends on the rate of rotation of the brush 56.

If by the application of the speed control signals to the servo amplifier 14 the rate of rotation of the table 2 is reduced there would be a risk of the reader 27 running ahead of the interpolators 34 and 35, unless precautions be taken to the contrary. These precautions take the form of interlock means between the reader 27 the data stores 28 to 31, the programme unit 32 the selector 33 and quadratic interpolators. A working control switch 57 is operated by the shaft 11 which carries the brush 56 of the interpolators, and this switch is arranged to apply a selector advance signal to the selector 33 at some time in each half revolution of the brush 56 after a change from one interpolator to the other. The switch 57 also delivers a working advance signal to the programme unit 32 via a connection 58 during each half cycle of the brush 56 so as to control the programme in such a way that the clearance of a data store and the acceptance of a new instruction from the tape reader 27 can only occur when the instruction in the corresponding store is no longer required by the interpolators. The programme unit 32 feeds a reader advancing signal to the reader 27 by way of a connection 59 when there is a store available in receipt of a further signal. Connections 60, 61 and 62 are shown leading from the stores 28 to 31 for the distribution of functional signals from the stores when the stores receive instructions from the reader which does not correspond to a dimension. There are also connections 63, 64 and 65 from the reader 27 to the programme unit 32 for conditioning the latter unit in response to specified conditions in the reader. The functional connections between the units 28 to 33 will be further described with reference to Figures 2 to 5.

In Figures 2 to 5 of the drawings, the following system of references has been adopted to simplify the description and understanding of the drawings. In all but Figure 4, which illustrates one of the data stores, reference beginning with the letters RL denote relays and references such as RLA and RLB denote the energising winding of the relays, the figure under such reference letters indicating the number of switches included in the relay and operated by the respective relay winding. Thus relay winding RLA operates two switches and those switches are denoted by the references RLA1 and RLA2. Similarly, relay winding RLB operates two switches RLB1 and RLB2. Each relay switch is shown with two contacts and a switch arm, and the contact which is engaged by the arm in the deenergised state of the corresponding relay is shown in black. References beginning with the letters SW denote switches other than relay switches. The operation of the switches SWA to SWD in Figure 2 will appear from the following description. The switch SWF comprises peckers for sensing the holes in each row of the record. If a hole exists in the tape at the position corresponding to any one of the peckers, a circuit is completed from a 24 v. line through the pecker. Since, in the present description only the code bits five to twenty-four are taken into account, only the peckers SWF5 to SWF24 are indicated in Figure 2 and they are connected to terminals A5 to A24 of the reading unit. The switches SWY and SWZ in Figure 3 and SWM and SWN in Figure 5 are so-called uniselectors or digit switches. Each comprises a plurality of banks of studs, each bank having twelve studs, and each bank being scanned by a pair of diametrically opposite contact brushes. The contact brushes of any one uniselector are arranged on a single shaft, and the studs in each corresponding bank are equiangularly disposed about that shaft. For example, in the case of the uniselector switch SWZ, the stud banks and corresponding brushes are denoted by the references SWZa to SWZe, and each stud bank and its corresponding brushes will be referred to hereinafter as a stud switch. Each uniselector has an electro-magnet (denoted by the uniselector reference) which when energised advances the stud switches in the corresponding uniselector by one position. The references SWYe, SWZf, SWMe and SWNe indicate interrupter contacts which are opened on energising the corresponding uniselector magnets.

Where terminals in different figures bear the same references, it implies that these contacts are connected together in the assembled machine. Contacts which serve to deliver signals from the reader 27 shown on Figure 2 are denoted by references A, thus A5, A6 and so on. Contacts which serve to deliver signals from the programme unit 32, the data stores 28 to 31 and the selector 33 are denoted respectively by references B, C and D. Any other contacts will be referred to specifically on the description.

In Figure 2, references X1 denotes a three phase motor which drives the record advancing mechanism, which may be of conventional construction. The drive is however transmitted to the mechanism only on engagement of a clutch and such engagement is secured by energisation of the armature winding denoted by X2. When the armature winding is energised the record is advanced intermittently, one row at a time and each row is sensed by the peckers SWF5 to SWF24.

Before proceeding further with the general description of Figures 2 to 5, the construction of the data stores 28 to 31 will be referred to. These stores are identical and each store comprises five sub-units (which are almost identical) one for each decimal digit of the code used on the record, and in the store shown in Figure 4, which will be assumed to be the store 28, corresponding parts in the different sub-units have the same reference numerals. In the case of Figure 4, relays are denoted by references RA to RD, the switches of these relays being differentiated, for example, as RA1, RA2, RA3 and so on. References MC1 to MC12 denote metal rectifiers. Only the sub-unit 1 and parts of the sub-units 2 and 5 of the data store 28 are shown in Figure 4, since the construction of the complete store can be gathered from these parts. The sub-unit 1 corresponds to the highest order decimal digit, sub-unit 2 corresponds to the decimal digit of next highest order and so on. When the store is clear, all the relays RA to RD are de-energised, but on the application of code signals to the terminals A5 to A24, when the peckers SWF5 to SWF24 sense a row of holes in the record, the relays are changed to a corresponding combination of states, provided a sensitising pulse is simultaneously applied to the terminal B1. The sensitising pulse is applied to all the relay circuits in one store, and it acts to "clear" any relay which does not simultaneously receive a code signal corresponding to a binary digit of value "one." Therefore it will be appreciated that a sensitising pulse can be regarded as clearing the data store, which will be changed to the "all zero" state unless code signals are simultaneously applied. The construction and operation of the relay circuits are described in detail in co-pending U.S. patent application Serial No. 459,794. The sub-units of the store include analogue units denoted by the reference AU1 to AU5 having output terminals differentiated by suffixes $a$ and $b$ and when the relays in any sub-unit have been set in the combination of binary states which represents the corresponding decimal digit, the operation of switches in the analogue unit cause an alternating voltage to be set up between the output terminals having an amplitude analogous to the desired decimal digit. The voltages set up by the various analogue units have the same phase and the same amplitude scale, and the voltages are combined in series by transformers TR2 to TR5, each of which produces an amplitude reduction by a factor 10, in such a way that the resultant voltage which is set up at the terminal C1 is the analogue of the five digit decimal number represented by a particular group of code signals applied to the terminals A5 to A24. The analogue output terminals of the other data stores 29 to 31, are denoted by the references $C1_2$, $C1_3$ and $C1_4$, where they appear in Figure 5. Similarly the input terminals for sensitising pulses in these data stores are denoted by the references $B1_2$, $B1_3$ and $B1_4$, in Figure 3. The relay switches RA2 to RD2 set up output signals when the five binary digits of any decimal digit are all "one." One such output appears at terminal C2, corresponding to connection 62 of Figure 1, and represents "stop." Another such output appears at terminal C3, corresponding to connection 61 in Figure 1 and represents "error." The relay switches RA3 to RD3 in all sub-units set up an output which appears at terminal C4 (corresponding to connection 60) when an "all zero" state exists. This represents "zero advance." The connections 60, 61 and 62 are common to all stores, as seen in Figure 1, so that "stop," "error" and "zero advance" signals are effective in any store.

When the machine is being prepared for operation, a record of the instructions to be followed can be inserted by opening the door of the reader and subsequently opening the film gate. The opening of the door opens SWD and de-energises relay RLG, and breaks the circuit for the motor X1 and the clutch armature winding X2. The opening of the film gate closes the switch SWA and completes a circuit via terminal A25, which energises the relay RLX in the programme unit (Figure 3). This in turn closes all the switches RLX1 to RLX4 and causes the simultaneous application of a sensitising signal, via terminals $B1_1$ to $B1_4$, to all the data stores 28 to 31, thus clearing the stores. When the record has been inserted, the closing of the gate and door, removes the common sensitising signals from the stores and conditions the motor X1 and armature winding X2 for operation. Since all the stores are in "all zero" state, the zero advance signal from a terminal C4 energises relay RLC, closes switch RLC1, energises the clutch armature winding X2 and causes a sensing operation to be performed on the record. If the packers SWF5 to SWF24 encounter no holes, as may be the case at the beginning of each record, the "zero advance signal" is maintained, and the process continued until an instruction is encountered on the record. Between successive sensing operations by the reader, the record drive mechanism closes the switch SWC, which feeds a "sensitising selector advance signal" by way of connection A27 (Figure 2) to electromagnet SWZ and advances the respective uniselector one step. Consequently successive sensitising signals from terminal A26 are fed in cyclic order to the four stores 28 to 31. It is intended that the first actual instruction on the record will be "stop," namely five "ones" for the first decimal digit. The sensing action of the peckers is accompanied by closure of the switch SWB and this feeds a sensitising signal via A26 (which corresponds to the connection 64) to the brushes of the stud switch SWZ$e$ of the programme unit. Thus, the signal is applied to the sensitising signal input terminal of one of the data stores, say the terminal $B1_1$ of store 28. This sets up the "stop" signal in store 28, and the signal from terminal C2 energises relay RLD in the reader, breaking the clutch armature circuit at RLD1. As shown in Figure 1, the stop signal also passes to the programme unit 32, the selector 33 and the servo amplifier 14. In the programme unit 32, the "stop" signal energises the relays RLU and RLW. The first relay closes the switches RLU1 and RL2 which complete self-advancing circuits for the uniselectors SWZ and SWY through their own interrupter contacts SWZ$f$ and SWY$c$. As a consequence, these uniselectors "home" until brushes of stud switches SWZ$a$ and SWY$a$ engage open-circuited studs. When "home," stud-switch SWZ$e$ connects the sensitising pulse terminal A26 of the reader to terminal $B1_1$ of data store. In the selector 33, the stop signal energises the relay RLN. This completes a self-advancing circuit for the uniselectors SWM via the switch RLN1 the interrupter contacts SWM$e$, which has the effect of homing the uniselector SWM, until a brush of stud switch SWM$a$ engages an open-circuited stud. A similar action initiated by RLN2 homes the uniselector SWN. The resistors R4 and R6 of the selector (Figure 5) are provided to reduce current dissipation in the electro-magnets SWM and SWN and are inserted in circuit by the relays RLK and RLL when the magnets are energised for any appreciable time. It is to be noted that although there are three home studs in each of the uniselectors SWY, SWM and SWN they are electrically identical, since an operating cycle of each uniselector is completed in four steps. When the machine has "homed" in response to a "stop" signal, the relay RLC is energised.

The relays RLU, RLV and RLW perform functions which are not material to the present invention.

To start operation of the machine after a "stop" signal, the start switch (Figure 2) is closed. This energises the relay RLA and by the closure of the switch RLA2 energises the relay RLB which then holds itself by operating switch RLB1, at the same time de-energising RLA. During the time that RLA is energised, the clutch armature is energised by way of the switch RLA1 and one sensing operation ensures the switch RLG being closed. The action of RLB in de-energising relay RLA is to ensure that operation of the start switch will only over-ride one instruction on the record, even though the start switch is closed for longer than the time of one sensing operation. When the relay RLB is energised it closes the switch RLB2 and since RLD2 is closed due to the "stop" signal a clearing signal is set up at terminal A25, which clears all the stores by the action above described. This of course clears the stop signal.

The clearance of the "stop" signal allows the clutch to be energised through the switch RLC1, since the relay RLC is energised. This is the normal operating circuit for the clutch. The instruction now sensed by the operation of the clutch, is passed to one of the data-stores by the action of the sensitising pulse. This instruction will be assumed to be a dimensional instruction. Three further instructions are now sensed in succession and the corresponding code signals directed to the stores in cyclic order, the uniselector SWZ being advanced one step following the storage of each instruction. However when the fourth instruction has been passed to store, the uniselector SWZ now finds itself in position "four" while the uniselector SWY is yet in position "one" since apart from homing operation the uniselector SWY is advanced only on receipt of working advance signals at the terminal E1. Such signals are received, at times which will appear, from switch 57 via the connection 58 (Figure 1). When the uniselector SWZ is three positions or more in advance of the uniselector SWY, the circuit to ground from the reader advance terminal B2 via RLY1 is broken at one or other of the three stud switches SWZb, SWZc and SWZd. The breaking of this circuit simultaneously breaks a locking circuit, via terminal B3, which prevents rotation of the worktable (by biasing off the servo-amplifier 14 of Figure 1). Therefore the worktable begins to rotate and with it the interpolators' shaft 11 (Figure 1).

It is arranged that the rotation of the shaft 11 starts with the brush 56 on the mid-stud of the studs 36 to 45, belonging to the interpolator 34. The uniselectors SWM of the selector 33 (Figure 5) is in "home" position, thus feeding the analogue stored in, say, the stores 28, 29 and 30 to the interpolator 34 and at some time before the brush 56 reaches the stud 45 it is arranged that the switch 57 feeds a selector advance to the terminal E3 of the selector 33, advancing the uniselector SWN by one step. This causes SWN to apply the analogues set up in the stores 29, 30 and 31 to the interpolator 35 so that when brush 56 changes to stud 46 there is no discontinuity in the input instruction signal to the error detector 21. Moreover when the changeover has taken place from interpolator 34 to interpolator 35, the switch 59 feeds a working advance signal to the terminal E1 of the programme unit (Figure 3). This working advance signal energises the relay RLY and subsequently the relay RLZ, which is a holding relay. The relay RLZ also inserts a resistor in series with the electromagnet SWY to reduce the current dissipation therein. The working advance signal energises magnet SWY and advances the stud switches SWYa and SWYb. The energisation of relay RLY closes the switch RLY1 and completes a circuit to ground from the reader advance terminal B2 allowing energisation of the relay RLC of Figure 2, and the sensing of the next instruction, although no circuit is completed through any of the stud switches SWZb, SWZe, SWZc and SWYb. Therefore, the lock is not reimposed on the table rotation through the terminal B3. When the action of the working advance signal ceases, uniselector SWZ is in position 5, (the last instruction having being passed to store 28) whilst the uniselector SWY is in position 2. This situation continues as long as the interpolator 35 is operating on the analogues derived from the data stores 29, 30 and 31. During this period the uniselector SWM receives a selector advance signal at E2 from the switch 57, and advances to apply the output of stores 30, 31 and 28 to the input of the interpolator 34 in readiness for the next changeover. After this changeover, another working advance signal is received from switch 57 at terminal E1 which initiates another reading cycle, and advances uniselector SWY to position 3. This process of operations continues indefinitely until another instruction "stop" is encountered, which stops operation and homes all the control mechanism. The action of the "stop" signal is immediate, and therefore when coding instructions, account has to be taken of the fact that the end two instructions before "stop" are not acted upon, and must be dummies.

The above described control mechanism with its interlocks insures that the frequency with which instructions are read from the record is varied automatically to suit the rate of table rotation, and thus the rate of relative displacement between the axes of the cutter 1 and the table 2. Thus, a change in the rate of the table rotation produces a corresponding change in the rate of interpolation and the interpolator, by controlling the switch 57, automatically controls the rate of advance of the selector 33 and via the programme unit controls the frequency of reading, so that no instruction is read unless there is a store available to receive it.

Modification may of course be made in the machine illustrated. Thus the invention is applicable to machine operating in other co-ordinate systems instead of cylindrical co-ordinates as described. The invention may also be applicable to machines controllable in three dimensions. Furthermore the invention may be applied to machines which derive instructions from a continuous record, and which do not therefore require an interpolator. Furthermore, if the instructions relate only to discrete points, as in the example described, it may in some cases be sufficient to subject them only to a linear interpolation process to derive a continuously variable instruction input. On the other hand it may be desirable in some cases to employ interpolations of higher order than quadratic. The invention is also applicable to machines for shaping work pieces other than by milling them.

In the examples described, the rate of deviation of the instruction signal for the servomotor is varied in response to the velocity of the servomotor 17 and thus to the servo error. The rate may alternatively or additionally be varied in response to the acceleration of the servomotor, or some other function of the servomotor displacement.

What we claim is:

1. A control system suitable for machine tools comprising means for deriving an instruction signal from a record at an adjustable rate, first displacement means for effecting relative displacement between two components of a machine tool in one co-ordinate direction in response to said instruction signal, second displacement means for effecting relative displacement between said two components in another co-ordinate direction in dependence upon the rate of derivation of said instruction signal, said second displacement means being adjustable to adjust the rate of change of displacement in the second co-ordinate direction, means responsive to said first displacement means for adjusting simultaneously the rate of derivation of said instruction signal and the rate of change of displacement in the second co-ordinate direction as a function of the displacement in the first co-ordinate direction.

2. A control system according to claim 1, said adjusting means being responsive to the rate of change of displacement in the first co-ordinate direction.

3. A control system according to claim 1, comprising interpolating means for deriving a continuously variable signal in response to discrete instructions read from said record, said adjusting means comprising means for adjusting the rate of interpolation effected by said interpolation means so as to adjust the rate of derivation of said instructions.

4. A control system according to claim 3, said interpolating means being arranged to effect quadratic interpolation.

5. A control system according to claim 3, comprising means for intermittently sensing said record to derive successive discrete instructions therefrom, means for storing derived instructions to provide an input of more than one instruction simultaneously to said interpolator, and means for discontinuing operation of said sensing means in dependence upon the condition of said storage means.

6. A control system according to claim 1 comprising means for deriving a function signal representing said function of the displacement in said first co-ordinate direction, wherein said adjusting means comprises an amplifier and means for varying the output of said amplifier in response to a said function signal, the second displacement means being responsive to the output of said amplifier to determine the rate of displacement in the second co-ordinate direction.

7. A control system according to claim 6 comprising a servo motor for effecting the displacement in said first co-ordinate direction, and a tacho generator for deriving said signal representing said function of the displacement in the second co-ordinate direction.

8. A control system suitable for automatic machine tools comprising means for deriving an instruction signal from a record at an adjustable rate, servo means for effecting relative displacement between two components of a machine tool, means for deriving a feedback signal analogous to said relative displacement, means for comparing said instruction and feedback signals to derive an error signal, said servo means being responsive to said error signal to effect said relative displacement, and means responsive to said error signal for adjusting the rate of derivation of said instruction signal.

9. A control system according to claim 8 wherein said adjustment means is responsive to the rate of change of relative displacement of said components.

10. A control system according to claim 8 wherein said adjusting means comprises means for reducing the rate of derivation of said instruction signal when said error signal increases, and vice versa.

11. A control system according to claim 8 wherein said means for deriving an instruction signal comprises means for reading said record to derive successive discrete signals therefrom, storage means for storing successive groups of said instructions, means operative at an adjustable rate for interpolating among stored discrete signals to derive said instruction signal, said adjusting means being operative to vary the rate of operation of said interpolation means to vary the rate of derivation of said instruction signal, and means for controlling said record reading means in response to the rate of operation of said interpolating means.

References Cited in the file of this patent

UNITED STATES PATENTS

| | | |
|---|---|---|
| 2,537,427 | Seid et al. | Jan. 9, 1951 |
| 2,628,539 | Neergaard | Feb. 17, 1953 |
| 2,685,054 | Brenner et al. | July 27, 1954 |
| 2,710,934 | Senn | June 14, 1955 |
| 2,736,852 | Nelson | Feb. 28, 1956 |

OTHER REFERENCES

"A Numerically Controlled Milling Machine," published by Servomechanisms Laboratory, MIT May 31, 1953.

UNITED STATES PATENT OFFICE

CERTIFICATE OF CORRECTION

Patent No. 2,887,638                                 May 19, 1959

Roland Allan Cail et al.

It is hereby certified that error appears in the above numbered patent requiring correction and that the said Letters Patent should read as corrected below.

In the heading to the printed specification, between lines 8 and 9, insert -- Claims priority, application Great Britain, July 3, 1954 --.

Signed and sealed this 13th day of October 1959.

(SEAL)
Attest:

KARL H. AXLINE                                          ROBERT C. WATSON
Attesting Officer                                    Commissioner of Patents